(12) United States Patent
Huizingh et al.

(10) Patent No.: US 9,802,731 B2
(45) Date of Patent: Oct. 31, 2017

(54) FLEXIBLE LIGHTWEIGHT CONTAINER

(71) Applicant: Schoeller Arca GmbH, Schwerin (DE)

(72) Inventors: Jan Abraham Huizingh, Vlagtwedde (NL); Sipko Mulder, Leeuwarden (NL); Herman Gommer, Schoonebeek (NL); Albert Jurgens, Kloosterhaar (NL)

(73) Assignee: SCHOELLER ALLIBERT GMBH, Schwerin (DE)

( * ) Notice: Subject to any disclaimer, the term of this patent is extended or adjusted under 35 U.S.C. 154(b) by 0 days.

(21) Appl. No.: 14/772,809

(22) PCT Filed: Mar. 21, 2014

(86) PCT No.: PCT/IB2014/000498
§ 371 (c)(1),
(2) Date: Sep. 4, 2015

(87) PCT Pub. No.: WO2014/147478
PCT Pub. Date: Sep. 25, 2014

(65) Prior Publication Data
US 2016/0009446 A1    Jan. 14, 2016

Related U.S. Application Data

(60) Provisional application No. 61/804,327, filed on Mar. 22, 2013.

(51) Int. Cl.
| | | |
|---|---|---|
| *B65D 3/28* | (2006.01) |
| *B65D 6/18* | (2006.01) |
| *B29C 45/14* | (2006.01) |
| *B65D 1/26* | (2006.01) |
| *B65D 1/34* | (2006.01) |
| *B65D 6/00* | (2006.01) |
| *B29C 45/00* | (2006.01) |
| *B29K 101/12* | (2006.01) |
| *B29L 31/00* | (2006.01) |

(52) U.S. Cl.
CPC .... B65D 11/1833 (2013.01); B29C 45/14196 (2013.01); B29C 45/14336 (2013.01); B65D 1/26 (2013.01); B65D 1/34 (2013.01); B65D 11/10 (2013.01); *B29C 2045/0043* (2013.01); *B29C 2045/14237* (2013.01); *B29K 2101/12* (2013.01); *B29L 2031/712* (2013.01)

(58) Field of Classification Search
CPC ...... B65D 11/1833; B65D 1/48; B65D 11/26; B29C 45/14336
See application file for complete search history.

(56) References Cited

U.S. PATENT DOCUMENTS

| 3,511,902 A * | 5/1970 | Santangelo ....... B29C 45/14475 264/163 |
| 2003/0015576 A1 * | 1/2003 | Canino ............. B29C 45/14475 229/4.5 |
| 2011/0272458 A1 * | 11/2011 | Hardy ................ B65D 5/48016 229/120.17 |

* cited by examiner

*Primary Examiner* — Galen Hauth
(74) *Attorney, Agent, or Firm* — Polsinelli PC

(57) ABSTRACT

A light weight container (1) comprising a base (3), four sidewalls (2) and four corner portions, characterized in that the corner portions are so arranged as to allow flexibility between the sidewalk (2) so that an upper opening area of the container (1) can be made smaller by forcing the sidewalls (2) towards each other (compression) and larger by forcing the sidewalk (2) apart (expansion). The invention also relates to a process for the manufacturing of a container (1).

9 Claims, 3 Drawing Sheets

Figure 1:
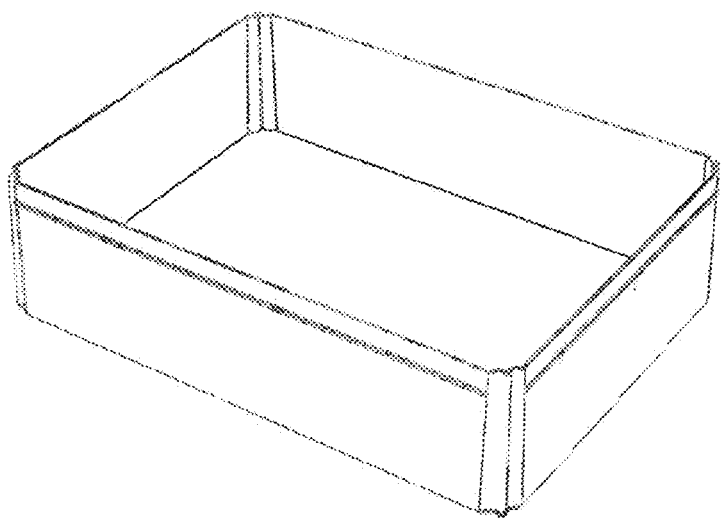

Figure 3a
Figure 3b
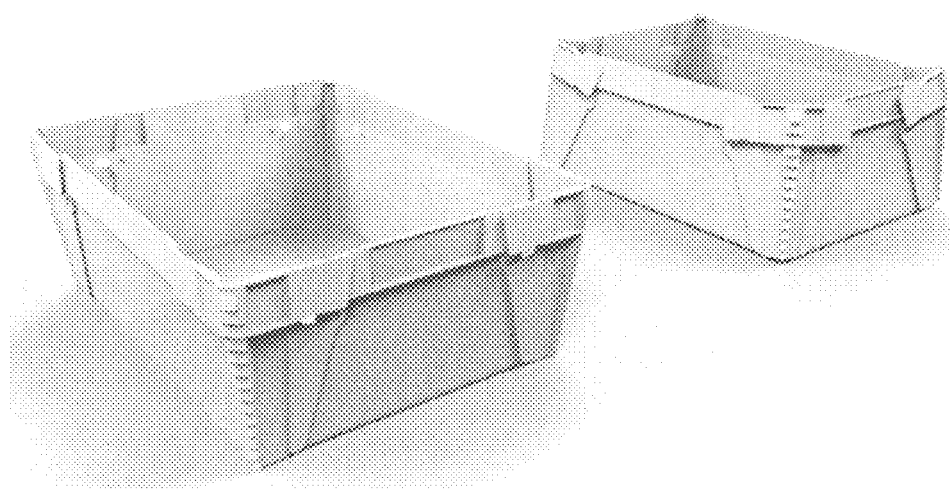
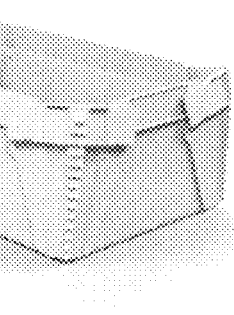
Figure 3a'
Figure 3b'
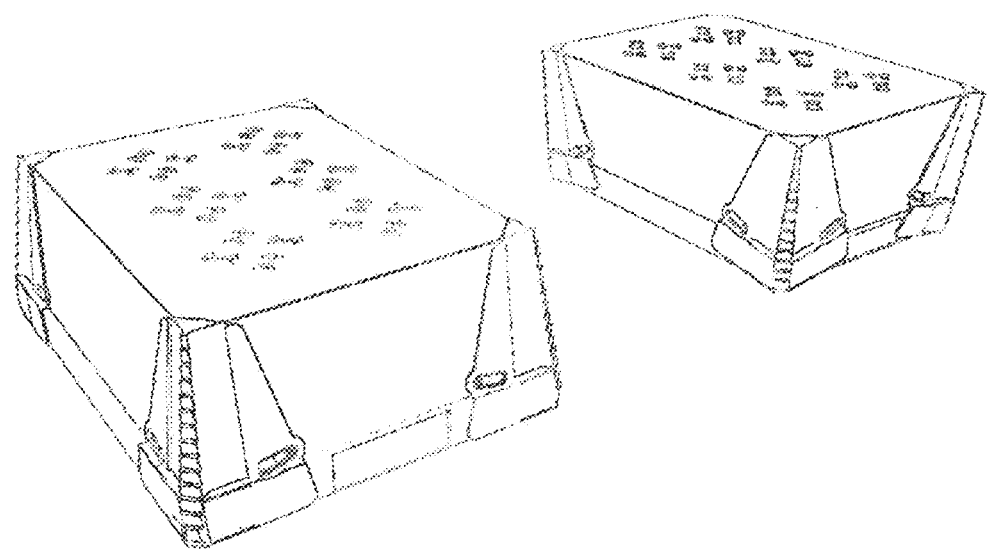

FLEXIBLE LIGHTWEIGHT CONTAINER

CROSS REFERENCE TO RELATED APPLICATIONS

This application is a 35 U.S.C. §371 National Stage application of International Application PCT/IB2014/000498, filed Mar. 21, 2014, which in turn, claims priority of U.S. Patent Application No. 61/804,327, filed Mar. 22, 2013, the entire disclosures of which are herein incorporated by reference.

BACKGROUND OF THE INVENTION

1. Field of the Invention

The present invention relates to a lightweight container and a process for obtaining a lightweight container with increased flexibility and which is easy to handle.

Containers made of different materials such as wood, metal, plastic material etc. are commonly used nowadays. One problem with these containers is that they often demand the same amount of transport space when transported back to the source.

An alternative to returning the container is a so called one way package which is disposed of when it has served its purpose.

Another common way to solve the problem is to provide the container with a so called nesting function. This implies that empty containers are placed partly in one another b providing its side walls with an inclination.

Yet another way to solve the problem is to dismount or fold the side walls of the containers. The most common type of side wall dismantling is the pallet and pallet collar. An example of a common container with foldable side wails is the collapsible pallet container. The side walls are here made foldable by being attached to the base a hinge.

A disadvantage with collapsible containers is that they will have to be provided with some type of locking device which keeps the side walls together when erected so that the load absorption capacity and the stability isn't deteriorated. These are, to different degrees, difficult to operate which results in a large amount of time consumed when handled.

Logistics may furthermore be improved from today's situation where a container transport system with many parts such as containers, lids, separate sidewalls, locking handles etc. needs to kept in order and stored.

SUMMARY OF THE INVENTION

It has through the present invention been made possible to simplify logistics through a more flexible lightweight container. Accordingly the invention relates to a light weight container comprising a base, four sidewalls and four corner portions. The invention is characterized in that the corner portions are so arranged as to allow flexibility between the sidewalls so that an upper opening area of the container can be made smaller by forcing the sidewalls towards each other (compression) and larger by forcing the sidewalls apart (expansion).

According to a preferred embodiment of the invention the flexibility in the corner portions is so arranged as to allow a first container to be at least partly covered by a second container arranged bottom up, on top of the first container by;

a)—forcing the sidewalk together on the first container,
b)—forcing the sidewalk apart on the second container or;
c)—a combination of the steps a)+b).

According to one embodiment of the invention said base and said sidewalls are forming a carrying framework of the container. At least two adjacent sidewalls are then provided with vertical edges. These vertical edges are connected via a flexible pre-cut sheet which will act as a hinge allowing a predetermined amount of flexibility in the corner between the two adjacent sidewalls.

The precut sheet is suitably pre-shaped to form a below-like structure whereby a more controlled juxtaposition of two adjacent sidewalls is obtained, regardless of the level of compression or expansion.

According to one embodiment of the invention the sidewalls are connected to the base via hinges. These may suitably be of the type known to the man skilled in the art as live hinges. The container is further provided with four corner pillars. These corner pillars are connected to the base via hinges, also these are suitably of the live hinge type. The sidewalls and corner pillars are provided with means for a moveable connection between each corner pillar and its adjacent sidewalls.

The corner pillars and sidewalls are preferably provided with slots and pegs respectively. These slots and pegs are intended to interact and where the length of the slots will provide a predetermined range of compression and expansion respectively. It will accordingly be made possible to mold the container in an open position without the need to for more complicated mold designs like collapsing mold parts.

The invention also relates to a process for the manufacturing of a lightweight container as herein disclosed. The process involves the steps;

Inserting pre-cut sheets into a mold, the mold being provided with windows to hold the at least one pre-cut sheet in place during molding.

Closing the mold and injecting thermoplastic material into the mold, the mold being provided with cavities shaped as channels, the channels bonding the pre-cut sheets to the lightweight container. The channels are forming a carrying framework on the lightweight container.

The pre-cut sheets are advantageously arranged in the corners of said container, whereas said cavities forming said carrying framework is present on at least two edges of each pre-cut sheet. The pre-cut sheet will then act as a hinge allowing a predetermined amount of flexibility in the corner of the intended container.

The pre-cut sheets are suitably manufactured of a polymeric material. The polymeric material of the pre-cut sheet suitably has a Tg the same or higher than the Tg of the injected thermoplastic material. The precut sheet is suitably pre-shaped to form a below-like structure.

The polymeric material of the pre-cut sheet is advantageously selected from the group consisting of;

polypropylene,
low density polyethylene,
high density polyethylene,
polyester,
polycarbonate,
polyethylene terephthalate,
a laminate between polypropylene and polyester or polycarbonate,
a laminate between high density polyethylene and polyester or polycarbonate,
any of the above with a predetermined amount of a known plasticizer,
and a mixture thereof.

According to embodiment of the invention the pre-cut sheet is perforated at the positions corresponding to the carrying framework, wherein a mechanical bond is achieved. This is especially advantageous in embodiments where the Tg of the pre-cut sheet is higher than the Tg of the carrying framework and also where the two polymeric materials are not fully compatible.

DESCRIPTION OF EMBODIMENT EXAMPLES

The invention is further described together with enclosed drawing showing a selected embodiment of the invention, wherein, FIG. 1 show, in perspective view a first embodiment of a light weight container 1 according to the invention.

Figure 2:
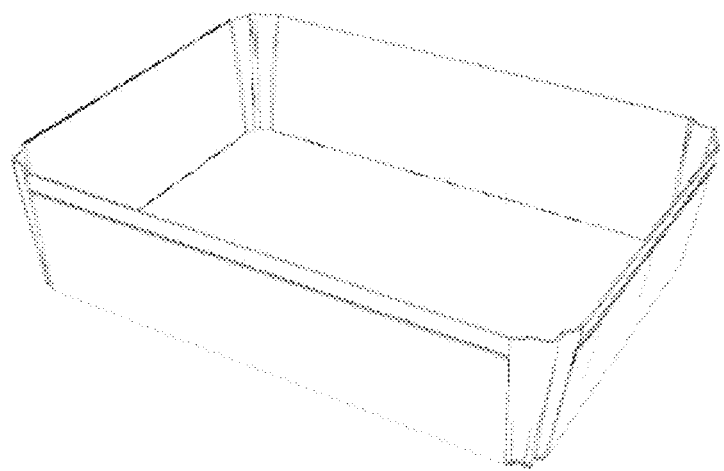

FIG. 2 show, in perspective view a first embodiment of a light weight container 1 according to the invention.

FIGS. 3a, 3b, 3a' and 3b' respectively, show, in perspective view a container 1 in expanded and compressed state in a variation of the embodiment shown in FIGS. 1 and 2.

Figure 4:
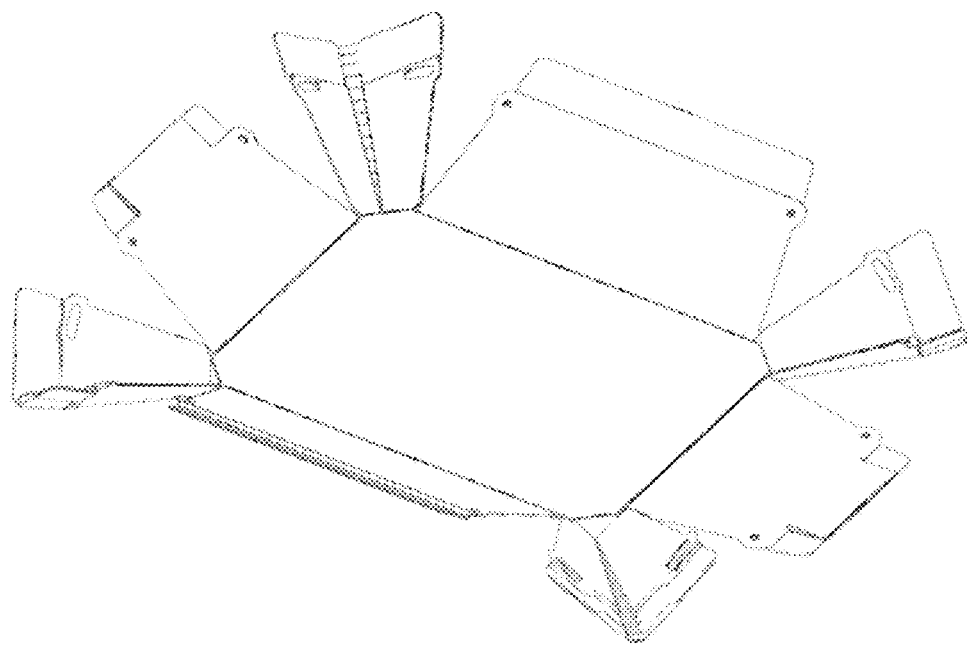

FIG. 4 show, in perspective view the container 1 from FIGS. 3a, 3b, 3a' and 3b' before being assembled.

Accordingly FIGS. 1 and 2 shows a first embodiment of a light weight container 1 comprising a base 3, four sidewalls 2 and four corner portions of the invention where pre-cut sheets 10 are arranged in the corners of said container 1, whereas said cavities forming said carrying framework 20 is present on at least two edges of the pre-cut sheet 10.

The pre-cut sheets 10 will then advantageously act as a hinge allowing a predetermined amount of flexibility in the corners of the container 1.

FIG. 1 show a container 1 with compressed corners while FIG. 2 shows a container 1 with expanded corners.

The embodiment shown in FIGS. 1 and 2 do have a feature that is advantageous when handling the container 1. It will be possible to nest empty containers 1 into one another since the corners are flexible on the container 1. Accordingly, an opening of the container 1 will become larger than a base of the container 1 when the corners are expanded. This will also allow a container 1 to he used as a lid. The corners of the first container 1 is then compressed while a second container 1, turned upside down and with expanded corners, can be lowered of the first container 1 to cover side walls and opening said first container 1. The flexible corners will allow this possibility even though the containers 1 are virtually identical in their relaxed state. This method of letting a container 1 be both a lid and a box is advantageous as it simplify the logistics by reducing the number of different parts needed to obtain a shipping unit. Straps, shrink film, elastic bands or the like may be used to keep such a shipping unit together. An elastic band or any similar contraption circumscribing the four side walls of the container 1 may also be used to hold the corners of a container 1 in the compressed state. When in this state it will be possible to stack a number of containers 1, one on top of the other. By removing said elastic bands it will again be possible to nest empty containers 1, one into the other. The elastic bands can be placed at the bottom of the containers 1 during return shipment.

The lightweight container 1 as described above may be manufactured comprising a process involving the steps;

inserting pre-cut sheets 10 into a mold, the mold being provided with windows to hold the at least one pre-cut sheet 10 in place during molding, closing the mold and injecting thermoplastic material into the mold, the mold being provided with cavities shaped as channels, the channels bonding the pre-cut sheets 10 to the lightweight container 1, the channels forming a carrying framework 20 on the lightweight container 1.

These pre-cut sheets 10 are arranged in the corners of said container 1, whereas said cavities forming said carrying framework 20 is present on two edges of each pre-cut sheet 10. It is possible to leave an opening between the base 3 of the container 1 and the pre-cut sheet 10. These could then serve the purpose of draining holes. It is of course also possible to completely close the container 1 by also molding in the bottom short side edge of the pre-cut sheet 10 with the corresponding base 3 portion of the container 1. The pre-cut sheet 10 will accordingly act as a hinge allowing a predetermined amount of flexibility in the corner of the intended container 1. The polymeric material of the pre-cut sheet 10 has a slightly higher than the Tg of the injected thermoplastic material. The precut sheet 10 is furthermore pre-shaped to form a below-like structure. A more controlled juxtaposition of two adjacent sidewalls 2 is hereby obtained, regardless of the level of compression or expansion. The polymeric material of the pre-cut sheet 10 is suitably a thermoplastic material with a predetermined amount of a known plasticizer.

FIGS. 3a, 3b, 3a' and 3b' show, in perspective view as seen from above containers 1 in expanded and compressed state in a variation of the embodiment shown in FIGS. 1 and 2. The container 1 is here not provided with pre-cut sheets 10 (see FIGS. 3a, 3b, 3a' and 3b') in the corner portion. Instead, the corner areas are provided with slots 12 and pegs 22 to limit the movement between a fully compressed state as shown in FIG. 3b and a fully expanded state as shown in FIG. 3a. The embodiment shown in FIGS. 3a and 3b can be handled the same way as the embodiment shown in FIGS. 1 and 2, and will have all the essential functions, described in connection to the embodiment described in FIGS. 1 and 2 above.

The sidewalls 2 are in accordance with embodiment shown in FIGS. 3a and 3b connected to the base 3 via hinges 5. These hinges are of the type known to the man skilled in the art as live hinges. For those not familiar with this type of hinge 5, the hinge 5 can be obtained by providing a line of thinner material in the container 1. Polymeric materials typically suitable for this type of design are polypropylene and polyamide. The first material would be the natural choice for the container 1 herein disclosed. It is advantageous to post treat the hinge 5 function for a longer product life. This can be achieved by subjecting the hinge itself to pressure by compressing the hinge 5. Flexing of the hinge 5 just after the molding has also been known to increase the product life. The container 1 is further provided with four corner pillars 4. These corner pillars 4 are connected to the base via hinges 5, also these are of the live hinge type. The sidewalls 2 and corner pillars 4 are provided with means for a moveable connection between each corner pillar 4 and its adjacent sidewalls 2. The corner pillars 4 and sidewalls 2 are provided with slots 12 and pegs 22 respectively. These slots 12 and pegs 22 are intended to interact and the length of the slots 12 will provide a predetermined range of compression and expansion respectively. It will accordingly be made possible to mold the container 1 in an open position like shown in FIG. 4 without the need to for more complicated mold designs like collapsing mold parts.

FIG. 4 shows, in perspective view, the containers 1 from FIGS. 3a, 3b, 3a' and 3b' before being assembled. The corner areas are provided with slots 12 and pegs 22 to limit the movement between a fully compressed state as shown in FIG. 3b-3b' and a fully expanded state as shown in FIG. 3a-3a'.

The invention is not limited by the embodiments shown since these can be altered in different ways within the scope of the invention.

We claim:

1. A process for the manufacturing of a lightweight container (1) comprising a base (3), four sidewalls (2) and four corner portions each comprising a pre-cut sheet (10), the corner portions being so arranged as to allow flexibility between adjacent sidewalls (2) so that an upper opening area of the container (1) can be made smaller by forcing the sidewalls (2) towards each other and so that the upper opening area of the container (1) can be made larger by forcing the sidewalls (2) apart; that said base (3) and said sidewalls (2) form a carrying framework (20) of the lightweight container (1), wherein at least two adjacent sidewalls (2) are provided with vertical edges, said vertical edges being connected via one of the pre-cut sheets (10) which will act as a hinge allowing a predetermined amount of flexibility in the corner portion between the two adjacent sidewalls (2); the process comprising the steps:

inserting the pre-cut sheets (10) into a mold, the mold being provided with windows to hold the pre-cut sheets (10) in place during molding;

closing the mold and injecting thermoplastic material into the mold to form the sidewalls (2) and the base (3) of lightweight container (1), the mold further comprising cavities shaped as channels, the channels bonding the pre-cut sheets (10) to the lightweight container (1), the channels forming the carrying framework (20) of the lightweight container (1).

2. The process according to claim 1, wherein said cavities forming said carrying framework (20) are present on at least two edges of each pre-cut sheet (10).

3. The process according to claim 1, wherein the pre-cut sheets (10) comprise a polymeric material and the polymeric material of the pre-cut sheets (10) has a glass transition temperature Tg the same or higher than the Tg of the injected thermoplastic material.

4. The process according to claim 1, wherein the pre-cut sheets (10) are pre-shaped to form a bellow-like structure.

5. The process according to claim 3, wherein the polymeric material of the pre-cut sheets (10) are selected from the group consisting of:
   polypropylene,
   low density polyethylene,
   high density polyethylene,
   polyester,
   polycarbonate,
   polyethylene terephthalate,
   a laminate between polypropylene and polyester or polycarbonate,
   a laminate between high density polyethylene and polyester or polycarbonate,
   any of the above with a predetermined amount of a known plasticizer,
   and a mixture thereof.

6. The process according to claim 1, wherein the pre-cut sheets (10) are perforated at the position corresponding to the carrying framework (20), wherein a mechanical bond with the injected thermoplastic material is achieved.

7. The process according to claim 2, wherein the pre-cut sheets (10) comprises a polymeric material and the polymeric material of the pre-cut sheets (10) has a glass transition temperature Tg the same or higher than the Tg of the injected thermoplastic material.

8. The process according to claim 2, wherein the pre-cut sheets (10) are pre-shaped to form a bellow-like structure.

9. The process according to claim 1, further comprising forming a live hinge between each of the sidewalls (2) and the base (3) during the step of injection of thermoplastic material into the mold.

* * * * *